United States Patent [19]
Morawski et al.

[11] 3,900,739
[45] Aug. 19, 1975

[54] DEVICE FOR PROVIDING A CURRENT SUPPLY TO INDUCTIVE LOADS BY USE OF A BATTERY AND A D. C. PULSE TRANSFORMER POSITIONED BETWEEN BATTERY AND LOAD

[75] Inventors: Wilhelm Morawski; Heinrich Raeithel, both of Munich, Germany

[73] Assignee: Messerschmitt-Bolkow-Blohm G.m.b.H., Munich, Germany

[22] Filed: Aug. 28, 1973

[21] Appl. No.: 392,229

[30] Foreign Application Priority Data
Aug. 29, 1972  Germany............................ 2242353

[52] U.S. Cl............. 307/41; 104/148 MS; 321/45 R
[51] Int. Cl............................ B60m 3/06; H02j 7/00
[58] Field of Search ................... 307/41; 323/25, 23; 104/148 MS; 308/10; 321/45 R

[56] References Cited
UNITED STATES PATENTS
3,258,613   6/1966   Felcheck et al................ 307/41 UX
3,426,259   2/1969   Ziehm............................. 307/41 X

*Primary Examiner*—A. D. Pellinen
*Attorney, Agent, or Firm*—Woodhams, Blanchard and Flynn

[57] ABSTRACT

A device for controlling the current supply to inductive loads through the use of a battery and d.c. pulse transformers associated with each load. Each of the d.c. pulse transformers are controlled from a central impulse generator so that at least the energization point of each of the d.c. pulse transformers are always shifted with respect to those of the remaining d.c. pulse transformers. The d.c. pulse transformers are conventional and can be controlled by the impulse generator for time shifting each at a predesignated time in the period so that the return energy from one load is absorbed by a different load.

9 Claims, 23 Drawing Figures

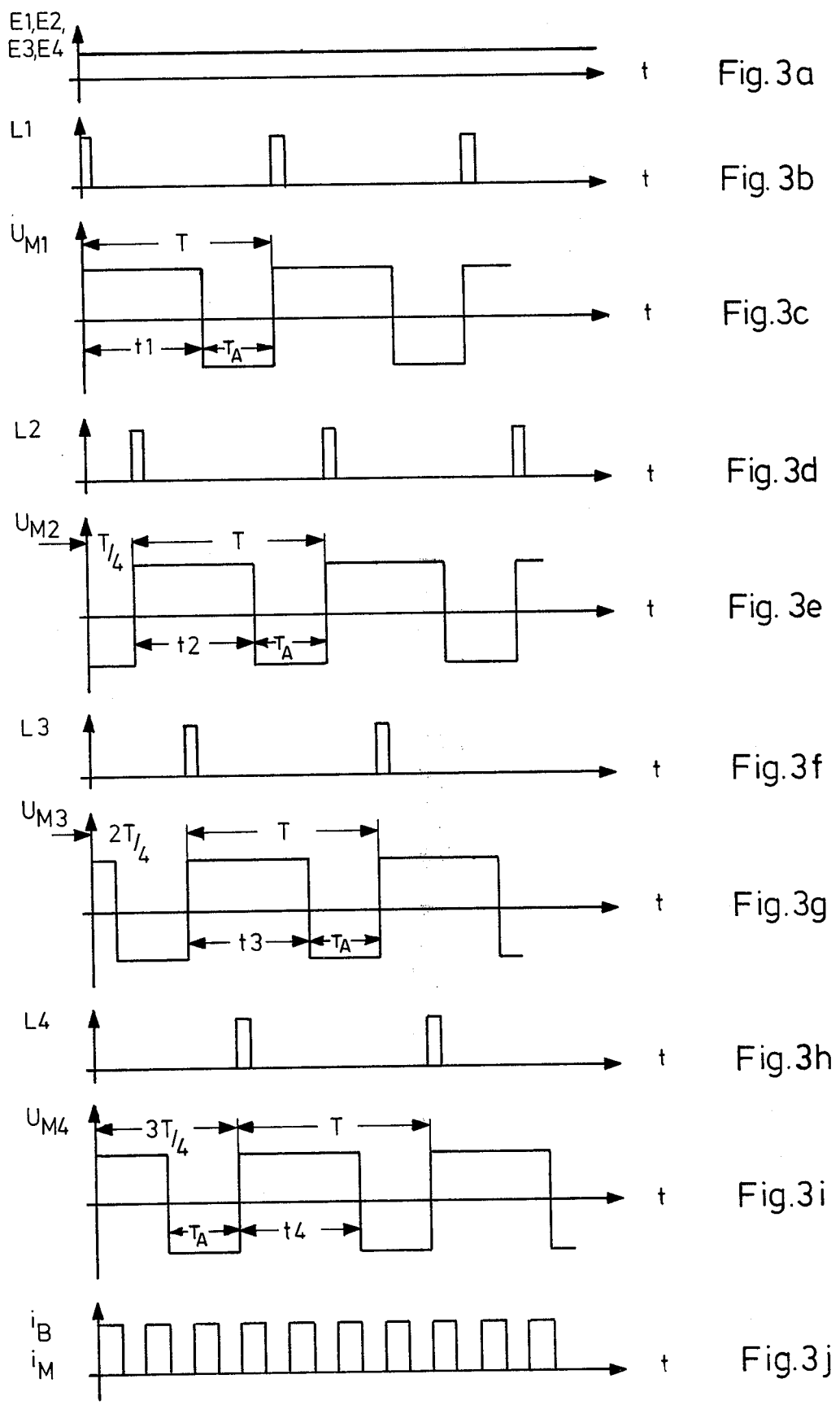

Fig. 4
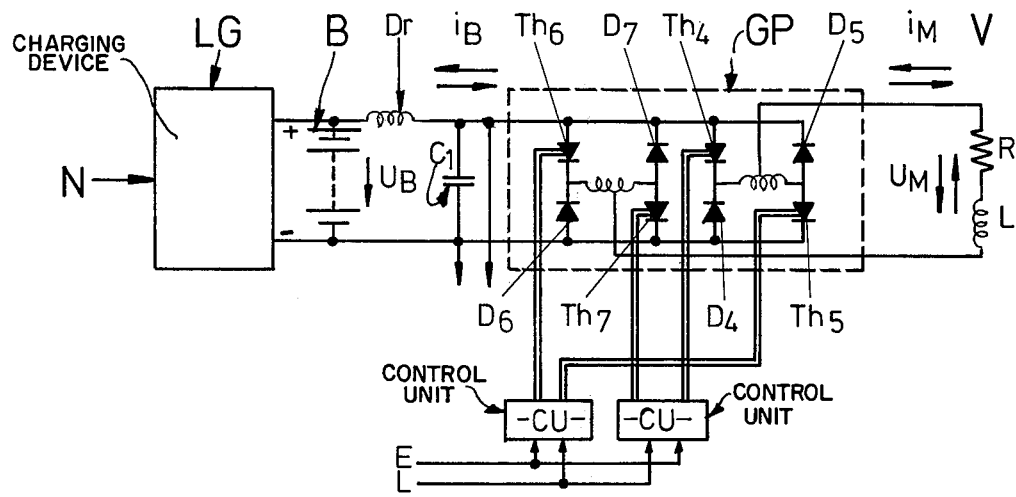
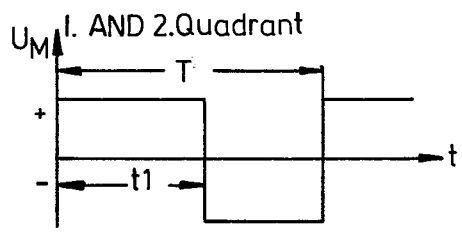
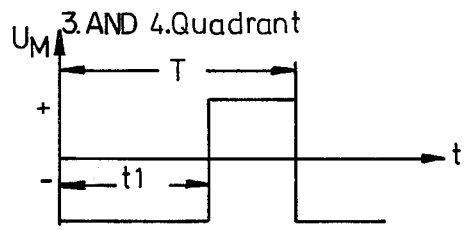
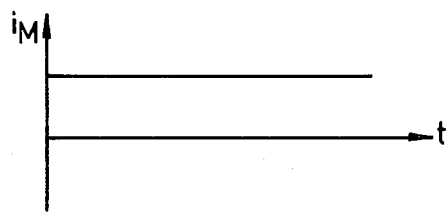
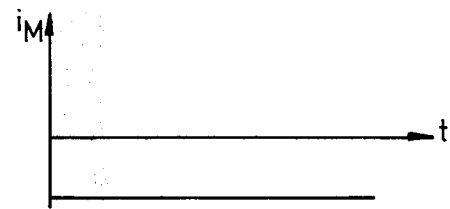
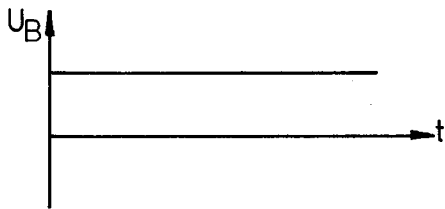
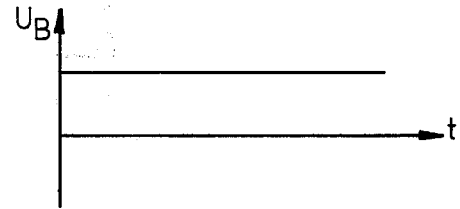
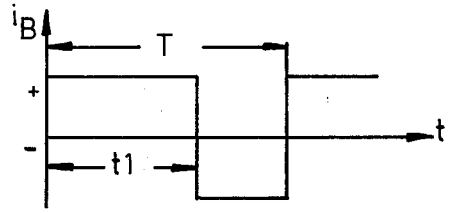
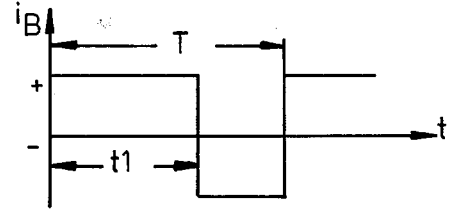
Fig. 4a       Fig. 4b

DEVICE FOR PROVIDING A CURRENT SUPPLY TO INDUCTIVE LOADS BY USE OF A BATTERY AND A D. C. PULSE TRANSFORMER POSITIONED BETWEEN BATTERY AND LOAD

FIELD OF THE INVENTION

The invention relates to a device for supplying current to inductive loads by means of a battery activated during the load maintaining operation, on the output side of which there are connected a desired number of two-quadrant d.c. pulse transformers. The apparatus described is particularly adaptable for supplying current to the support and guide magnets of a magnetically suspended vehicle.

BACKGROUND OF THE INVENTION

It is already known to transform d.c. voltages virtually without loss by means of pulse transformers and hence they are ideal control means for battery fed electric vehicles. Compare Heumann/Stumpe "Thyristoren" — Characteristics and Applications, 1970, B. G. Teubner, Stuttgart, Pages 146, 147 and 297.

However, also for the control of the direct currents of other inductive loads, d.c. pulse transformers are used which in the case of a magnetically suspended vehicle receive their control signals from a position regulating system which is required for maintaining the suspended condition of the vehicle. Here it is desired for reasons of the control dynamics obtainable from a d.c. pulse transformer that the magnet current be changed from the operating point in both directions at an equal characteristic, which means that the d.c. pulse transformer must effect an energy conversion in both directions. Further at a given ohmic loss resistance R and given inductivity L of the magnetic coil at the operating point, a sufficient rate of current change must be available.

A direction independent change of the magnet current is achieved by a so-called two-quadrant circuit of the d.c. pulse transformer (compare the above-mentioned literature). More particularly, a sufficient rate of current change is achieved by an appropriate voltage increase, namely by a correspondingly great ratio of maximum voltage to median d.c. voltage on the coil of the individual magnets at the operating point.

Moreover due to the magnetic energy which is stored in the inductivity of the load when the current supply is turned off, there occurs a return of this energy into the battery. If this on-and-off cycle occurs relatively often for a particular type of load, the battery may be damaged or destroyed in a relatively short time because same is capable of handling only a certain number of charging and discharging cycles, for example 100 times its rated capacity. If the inductive loads are the coils of support and guide magnets of a magnetically suspended vehicle, the switching rate of which lies in the magnitude of some 100 Hz, the breakdown time is reached relatively quickly.

On the other hand, one of the safety features which is required from a magnetically suspended vehicle is that if the current supply fails for a predetermined period of time, an emergency operation, at least for the duration of a braking operation, can be carried out, during which the suspended condition of the magnetically suspended vehicle must be maintained and contact with the guide rails must be avoided. For bridging this safety time period, sufficient energy must therefore be available on board the magnetically suspended vehicle to provide such energy supply to the support and guide magnetic systems. This is advantageously provided by a battery.

With reference now to such a battery, if only the conditions during failure of the supply means are considered, the energy which is developed during the time $t_1$ of one time period T to the magnet is, with the exception of the energy which has been consumed in the ohmic loss resistor R, fed back in the following time $T - t_1$ into the battery when the magnet current remains constant and additional switching losses are neglected. Such an operation is, as already mentioned, not acceptable for the protective battery of a magnetically suspended vehicle, because it provides an inefficient operation and because the constant charging and discharging change results in a rapid destruction of the battery.

It would be possible to reduce this effect in a known manner by parallel connection of protective capacitors with a correspondingly high capacity. However, such capacitors take up a relatively large space, have a considerable additional weight and are correspondingly expensive.

The basic purpose of the invention, therefore, is to produce a device for the current supply of inductive loads which are fed through d.c. pulse transformers from a d.c. source and in which the d.c. pulse transformers are constructed and operated so that the battery is substantially protected from the energy return occurring during each operating cycle.

Starting from the fact that, particularly in the case of a magnetically suspended vehicle, all support and guide magnets on the average require approximately the same current, this purpose is attained according to the invention by associating a d.c. pulse transformer with each load and by so controlling all d.c. pulse transformers, fed by one common battery through a central impulse generator, energy return from one load will be absorbed by a different load.

In this manner, according to the invention the individual d.c. pulse transformers are time shifted by the impulse generator, each at the times $T/n$, $2T/n$ ... $(n-1)T/n$, wherein T is the period duration of the d.c. pulse transformer and n is the number of the pulse transformers.

In this manner a continuous battery discharge is obtained and this leads to a substantially more satisfactory battery use. The feedback charging time of one load now coincides, with the exception of the difference based on operating losses, timewise with the charging time of another load so that there occurs a mutual feeding between two or more inductive loads. This has the advantage that there is now required from the battery only the operating part of the energy which must be fed to the loads and a periodic feedback to the battery will be avoided. Since the frequency of the discharge current impulse increases with the number of inductive loads which are to be controlled, variations in battery voltage can be reduced to a small residual ripple by relatively low capacity buffer capacitors.

In case of a source failure, the emergency current battery of a magnetically suspended vehicle can now be operated accurately in a substantially constant current output manner. When the source is undisturbed the load maintaining operation of the battery is available as is common in other vehicles.

It is of course no departure from the inventive thought herein to use a four-quadrant d.c. pulse transformer in place of the two-quadrant d.c. pulse transformer.

BRIEF DESCRIPTION OF THE DRAWINGS

The invention is described hereinafter in connection with two exemplary embodiments which are illustrated more or less schematically in the drawings, in which:

FIGS. 3a to 3j illustrate a pulse pattern for a device for providing a current supply to inductive d.c. loads according to FIG. 1 with four pulse transformers according to FIG. 2;

FIG. 4 comprises a block circuit diagram of a four-quadrant pulse transformer which may be substituted for the pulse transformer illustrated in FIG. 2;

FIG. 4a illustrates a diagram for the first and second quadrant, which diagram shows the waveform of current, voltage and energy of the pulse transformer according to FIG. 4, and FIG. 4b illustrates the corresponding diagrams for the third and fourth quadrant of the pulse transformer according to FIG. 4. The two FIGS. 4a and 4b do not show the diagrams for the control signals, the impulse generator signal, the start and quench pulses, but they are similar to those plotted — FIGS. 2a to 2d.

DETAILED DESCRIPTION

Figure 1:
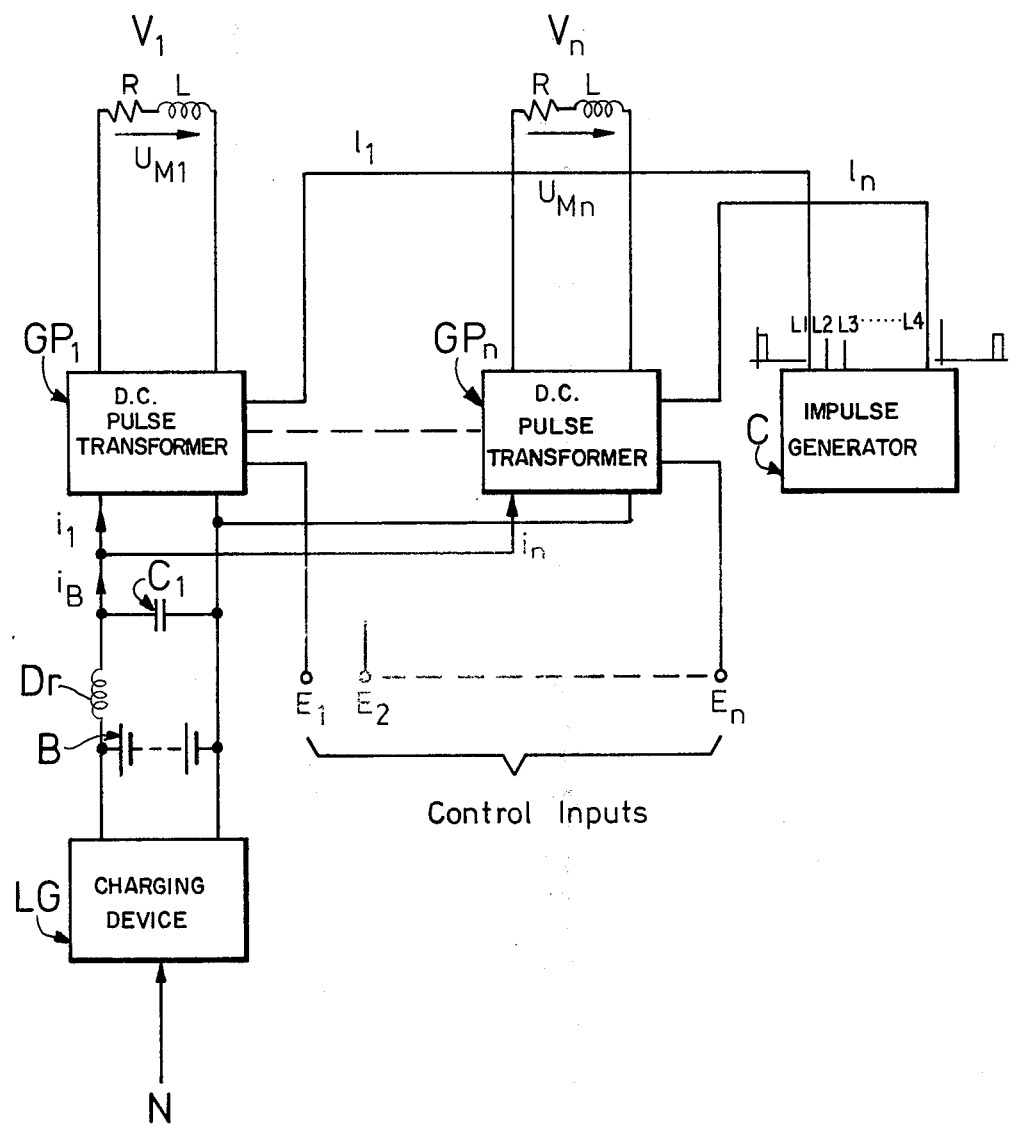
FIG. 1 illustrates a block circuit diagram of a device for providing a current supply to inductive d.c. loads according to the invention.

A number of loads $V_1$ to $V_n$ each of which comprises a resistor R and an inductor L, and which are, in the present exemplary embodiment, the excitation coils of support and guide magnets of a not illustrated magnetically suspended vehicle are, as shown in FIG. 1, supplied with d.c. voltage through the d.c. pulse transformers $GP_1$ to $GP_n$ from the battery B. The inductive loads can, however, also be the motor coils of drive motors or similar.

All d.c. pulse transformers are connected in parallel, whereby the positive pole of the battery is connected through a common smoothing inductor Dr and a common smoothing capacitor $C_1$ to the respective positive poles of the d.c. pulse transformers. The negative pole of the battery is connected to the negative poles of the d.c. pulse transformers.

A charging device LG is connected ahead of the battery B, through which charging device the battery is fed from a source N.

Control inputs $E_1$, $E_2$, $E_3$ to $E_n$ are associated with the pulse transformers $GP_1$ to $GP_n$. Further, an impulse generator C is provided which is connected to the individual pulse transformers through the lines $l_1$ to $l_n$. The control signals for a condition regulating system of the magnetic suspended vehicle which has n support and guide magnets, which system is here not illustrated, are fed to the control inputs $E_1$ to $E_n$. Thus the control time t varies between zero and T.

Figure 2:
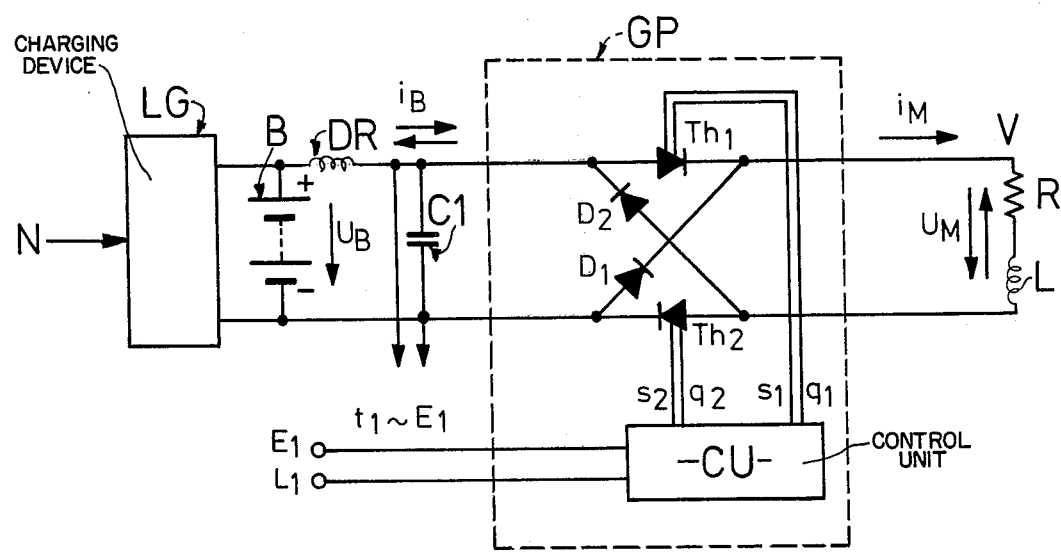
FIG. 2 illustrates a block circuit diagram for an individual pulse transformer according to FIG. 1.

FIG. 2 schematically illustrates one of the d.c. pulse transformers GP of the so-called two-quadrant type which are all identical to one another and wherein the same structural elements in relation to FIG. 1 are provided with the same reference numerals. Such transformer consists substantially of two oppositely acting quenchable thyristor switches $Th_1$ and $Th_2$ in the supply line and discharge lines respectively of the load V which is bridged by two also oppositely acting free-running diodes $D_1$ and $D_2$. The thyristor switches $Th_1$ and $Th_2$ each have a start line $s_1$ $s_2$ and quench lines $q_1$, $q_2$ leading to a control unit CU which generates start and quench pulses for said thyristor switches from input $E_1$ and $L_1$. All details regarding such a two-quadrant d.c. pulse transformer can be found in the literature mentioned above, especially on page 145 in connection with page 147, illustration 147.1c.

Further, in FIG. 2 the current direction arrows are illustrated for the battery current $i_B$ occurring during the operation and the magnet current $i_M$.

Figure 2A:
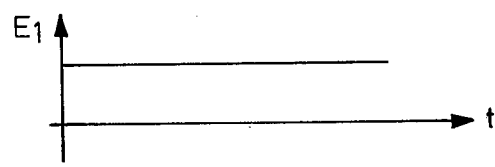
FIGS. 2a to 2h comprise diagrams which show the waveforms of control signal, impulse generator signal, start and quench pulses current, voltage and energy of the pulse transformer according to FIG. 2.
Figure 2B:
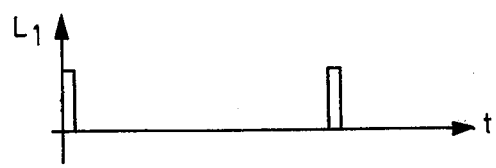
Figure 2C:
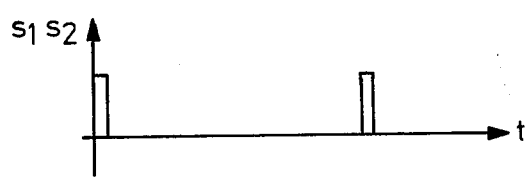
Figure 2D:
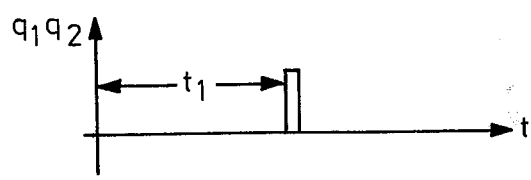
Figure 2E:
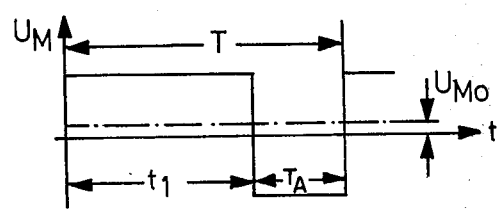

FIG. 2a shows the control signals $E_1$, $E_2$, $E_3$, $E_4$ which are plotted in relation to the time. In FIG. 2b the impulse generator signal is plotted in relation to the time. The thyristor start and quench pulses are shown in FIGS. 2c and 2d. FIG. 2c illustrates a period of duration T, which includes a control time $t_1$, during which a voltage $U_M$, in the present exemplary embodiment a magnetic voltage, is applied to the load. From the relationship of switching-on time and switching-off time per period, there results an arithmetic average $U_{Mo}$ of the magnetic voltage which can be substantially smaller than the excitation voltage.

Figure 2F:
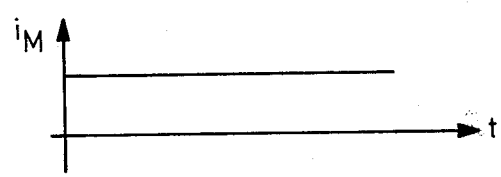
Figure 2G:
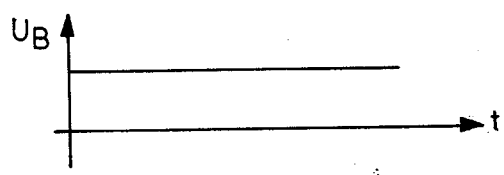
Figure 2H:
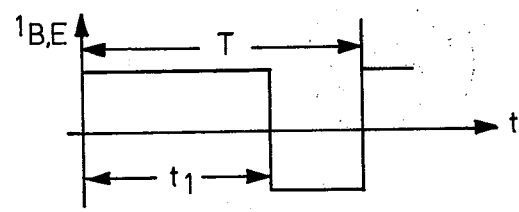

In FIGS. 2f and 2g the respectively associated magnet current $i_M$ and the battery voltage $U_B$ are plotted above the time. The FIG. 2h illustrates the associated battery current $i_B$ or the associated energy flow E also plotted above the time.

The d.c. pulse transformers GP which are illustrated in FIG. 1 are successively controlled by the impulse generator C and each is time-shifted at the time T, wherein T is the already mentioned pulse duration of the d.c. pulse transformer and n is the number of pulse transformers so that the energy which flows back during the switched off period $T_A$ of the one load is fed to a different load. In this manner, the energy return into the battery is substantially prevented.

FIGS. 3a–3j illustrate the pulse patterns for four loads, and therefore also for four d.c. pulse transformers, each being shown as a magnetic voltage $U_{M1}$ to $U_{M4}$ plotted in relation to the time t. This comprises pulse waveform shown in FIGS. 3c, 3e, 3g, 3i, and is referenced to the battery current $i_B$ in the pulse waveform illustrated in FIG. 3j, assuming that equal currents are provided in all four loads. The impulse generator signals on lines $L_1$, $L_2$, $L_3$, $L_4$ are in relation to the time T in FIGS. 3b, 3d, 3f and 3h.

This time shifted control of the d.c. pulse transformers thus leads to a very advantageous battery use because the return charging time — each negative part $T_A$ of the pulse curve in FIGS. 3c, 3e, 3g, 3i — of a load coincides timewise with the excitation or charging time of a different load, without regard to the difference based on operating losses of the load. Thus there is obtained a re-energizing between the individual loads with the pulses at the pulse frequency of the d.c. pulse transformers. Since the pulse frequency increases with the number of loads, this effect becomes more favorable as more loads are connected. For an equal distribution of the currents, there results at n-magnets for the time shifting $t_n$ $$T_n = \frac{T}{n}, \frac{2T}{n} ..., \frac{(n-1)T}{n} \qquad (1)$$

and for the battery current $i_B$ $$i_B = i_M \cdot n \cdot \frac{2t_1 - T}{T} \qquad (2)$$

wherein $i_M$ is the magnet current, T the period duration and $t_1$ the control time.

Of course it is possible to determine at unequally distributed median currents in several magnets — this means a relationship of maximum voltage to median voltage which differs from magnet to magnet — correspondingly unequally distributed time shiftings $t_{ni}$ which permit a discharge of the battery which is an optimum for the respective case.

The battery is thus in the case of breakdown of the current supply network efficiently operated with constant current discharge, while so long as the source remains available, the usual charge maintaining function continues.

In place of the two-quadrant d.c. pulse transformers it is possible to use also four-quadrant d.c. pulse transformers of the type illustrated in FIG. 4. The arrangement of these four-quadrant d.c. pulse transformers is generally similar to that illustrated in FIG. 1. This d.c. pulse transformer has four quenchable thyristors $Th_4$ to $Th_7$ energized by a bridge circuit and four associated free-running diodes $D_4$ to $D_7$. Such a pulse transformer is described in detail in the literature mentioned above on pages 148, 149.

FIGS. 4a and 4b illustrate, corresponding to FIGS. 2a to 2h, the waveform of the magnetic voltage $U_M$ of the magnet current $i_M$ of the battery voltage $U_B$ and the battery current $i_B$, each plotted in relation to the time in the first, second and third quadrant.

As is shown in FIG. 4, only the relationships on the load side differ from that of the embodiment according to FIG. 2, because here a voltage and current reversal is possible. On the battery side, the circuit according to FIG. 4 corresponds exactly to the circuit according to FIG. 2 so that here the same reference numerals are used.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. A device for controlling the current supply to a plurality of inductive loads, comprising:
   a battery;
   a plurality of normally open d.c. pulse transformer means equal in number to the number of said inductive loads connected between said battery and said inductive loads, each of said d.c. pulse transformer means having input terminals and output terminals thereon, said input terminals being connected to each other and to said battery so that said battery supplies an amount of electrical energy to each of said d.c. pulse transformer means, said inductive loads each being connected to said output terminals on a respective one of said d.c. pulse transformer means;
   control means for effecting a controlled sequential closing and opening of said d.c. pulse transformer means to effect a momentary connection of said battery to one of said inductive loads, at least one of said inductive loads being energized through a closed one of said d.c. pulse transformer means to thereby momentarily energize one of said inductive loads while the remainder of said inductive loads remains unenergized;
   cross-over means for connecting said energized inductive load to said input terminals of said d.c. pulse transformer means in response to said control means opening the connection of said battery and said one of said d.c. pulse transformer means so that the electrical energy in said inductive load will be transmitted to said input terminals including the input terminals of next sequentially operated d.c. pulse transformer means to be dissipated through the inductive load connected to said output terminals of said next sequentially operated d.c. pulse transformer means; and
   battery protection means for preventing said electrical energy from said inductive load damaging said battery.

2. A device according to claim 1, wherein said control means includes pulse generator means having a plurality of output terminals; and
   wherein each of said d.c. pulse transformer means has control terminal means thereon for effecting a change therein from said normally opening condition to said closed condition in response to an energization of said control terminal means, said control terminal means on each of said d.c. pulse transformer means being connected to one of said plurality of output terminals on said pulse generator means.

3. A device according to claim 2, wherein said pulse generator means has the characteristic for producing a signal at intervals spaced apart by a time factor $t_n$ where $$t_n = \frac{T}{n}, \frac{2T}{n} ..., \frac{(n-1)T}{n}$$

wherein $n$ = the number of d.c. pulse transformers
   T = the pulse duration for said d.c. pulse transformers and the electrical energy to each of said inductive loads is equal in magnitude.

4. A device according to claim 1, wherein each of said d.c. pulse transformer means is a two-quadrant d.c. pulse transformer.

5. A device according to claim 1, wherein each of said d.c. pulse transformer means is a four-quadrant d.c. pulse transformer.

6. A device according to claim 1, wherein said battery protection means includes electrical signal smoothing means connected between said battery and said input terminals.

7. A device according to claim 1, wherein said battery protection means includes a smoothing inductor connected in series between said battery and said input terminals.

8. A device according to claim 1, wherein each of said d.c. pulse transformers has a pair of input terminals, one being a positive terminal, the other being a negative terminal;
   wherein said input terminals of each of said d.c. pulse transformers are connected in parallel;
   wherein said battery protection means includes a smoothing inductor connected in series between a positive terminal on said battery and said positive input terminals on said d.c. pulse transformers and a smoothing capacitor connected between said positive and negative input terminals between said smoothing inductor and said input terminals.

9. A device according to claim 8, wherein each of said positive input terminals is connected through said d.c. pulse transformer to one side of said inductive load and each of said negative input terminals is connected through said d.c. pulse transformer to the other side of said inductive load; and
   wherein each of said cross-over means includes first unidirectional current limiting means connected between said one side of said inductive load and said negative input terminal and second unidirectional current limiting means connected between said other side of said inductive load and said positive input terminals.

* * * * *